United States Patent
Alami Hamedane et al.

(10) Patent No.: US 12,116,273 B2
(45) Date of Patent: Oct. 15, 2024

(54) METHOD FOR PRODUCING SULFUR FROM PHOSPHOGYPSUM

(71) Applicants: Universite Mohammed VI Polytechnique, Ben Guerir (MA); Universite Hassan 1ER De Settat, Settat (MA); Universite Hassan II De Casablanca, Casablanca (MA)

(72) Inventors: Younes Alami Hamedane, Casablanca (MA); Hassan Hannache, Casablanca (MA); Bouchaib Manoun, Settat (MA); Youssef Tamraoui, Settat (MA); Mina Oumam, Mohammedia (MA)

(73) Assignees: Universite Mohammed VI Polytechnique, Ben Guerir (MA); Universite Hassan 1ER De Settat, Settat (MA); Universite Hassan II De Casablanca, Casablanca (MA)

( * ) Notice: Subject to any disclaimer, the term of this patent is extended or adjusted under 35 U.S.C. 154(b) by 701 days.

(21) Appl. No.: 17/415,259

(22) PCT Filed: Dec. 9, 2019

(86) PCT No.: PCT/MA2019/050004
§ 371 (c)(1),
(2) Date: Jun. 17, 2021

(87) PCT Pub. No.: WO2020/130765
PCT Pub. Date: Jun. 25, 2020

(65) Prior Publication Data
US 2022/0055898 A1 Feb. 24, 2022

(30) Foreign Application Priority Data
Dec. 18, 2018 (MA) .......................... 44296

(51) Int. Cl.
*C01B 17/02* (2006.01)
(52) U.S. Cl.
CPC ...... *C01B 17/0264* (2013.01); *C01P 2002/72* (2013.01); *C01P 2002/88* (2013.01); *C01P 2004/03* (2013.01)
(58) Field of Classification Search
None
See application file for complete search history.

(56) References Cited

U.S. PATENT DOCUMENTS

| 3,460,912 A | 8/1969 | Squires |
| 3,607,068 A * | 9/1971 | Campbell ............. C01B 17/164 423/168 |
| 4,828,816 A | 5/1989 | Kostylkov |
| 5,066,474 A * | 11/1991 | Laird .................... C01B 17/506 423/171 |

FOREIGN PATENT DOCUMENTS

| CN | 102838154 | 12/2012 |
| JP | 2005187322 | * 7/2005 |
| WO | 2015153873 | * 10/2015 |

OTHER PUBLICATIONS

L. Yang et al; Utilization of phosphogypsum for the preparation of non-autoclaved aerated concrete; Construction and Building Materials 44 (2013) 600-606.
M. Zairi; Impacts environnementaux du stockage du phosphogypse a Sfax (Tunisie); Bulletin des laboratoires des Ponts et Chaussees—219—Jan./Feb. 1998 Ref 4145 pp. 29-40 (Abstract).
M. R. Mbhele, et al; Recovery of Sulfur from Waste Gypsum; Abstracts of the International Mine Water Conference, Proceedings ISBN No. 978-0-9802623-5-3; Oct. 19-23, 2009, Pretoria South Africa, pp. 622-630.
Marty, Sandrine; Production of Calcium Oxide and Sulfur Dioxide From the Decomposition of Phosphogypse; Thesis for Master of Applied Science, Department of Chemical Engineering, Montreal Polytechnique School, 2014 (Full Document in French, Abstract in English as translation).

* cited by examiner

*Primary Examiner* — Sheng H Davis
(74) *Attorney, Agent, or Firm* — Irving M. Fishman

(57) ABSTRACT

The objective of the invention is the development of a new process for producing sulfur from phosphogypsum. During this process, the phosphogypsum is mixed with a source of carbon and hydrogen forming a slurry after mixing. This source of carbon and hydrogen is a natural or synthetic organic polymer, as an example that is not limiting, biomass, used tires or plastic, kerogen or tars. The granules undergo a heat treatment (100 to 150° C.) to evaporate the mixing water.
The product obtained undergoes a heat treatment (550 to 900° C.) under a neutral atmosphere and/or partially oxidizing. The generated gases are bubbled in deionized water, sodium hypochlorite solution or a basic aqueous solution which allows the trapping, among others, of organosulfur molecules and the precipitation of sulfur S8. Non-entrapped gases are recovered to extract volatile sulfur products.

5 Claims, 3 Drawing Sheets

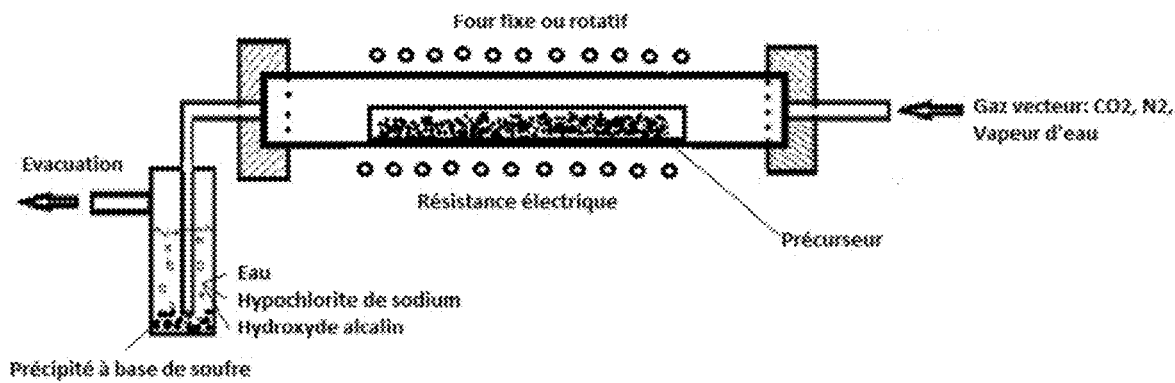
Figure 1: Diagram of the sulfur production prototype
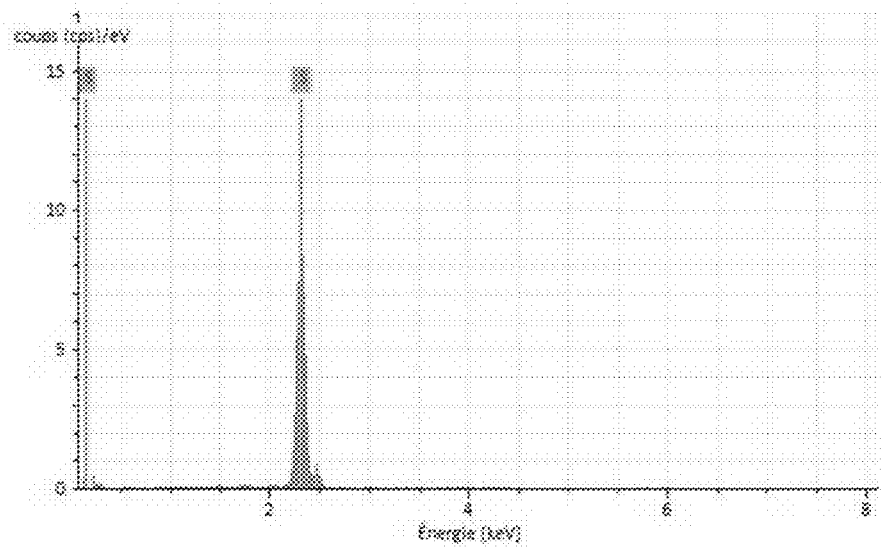
Figure 2: EDS analysis

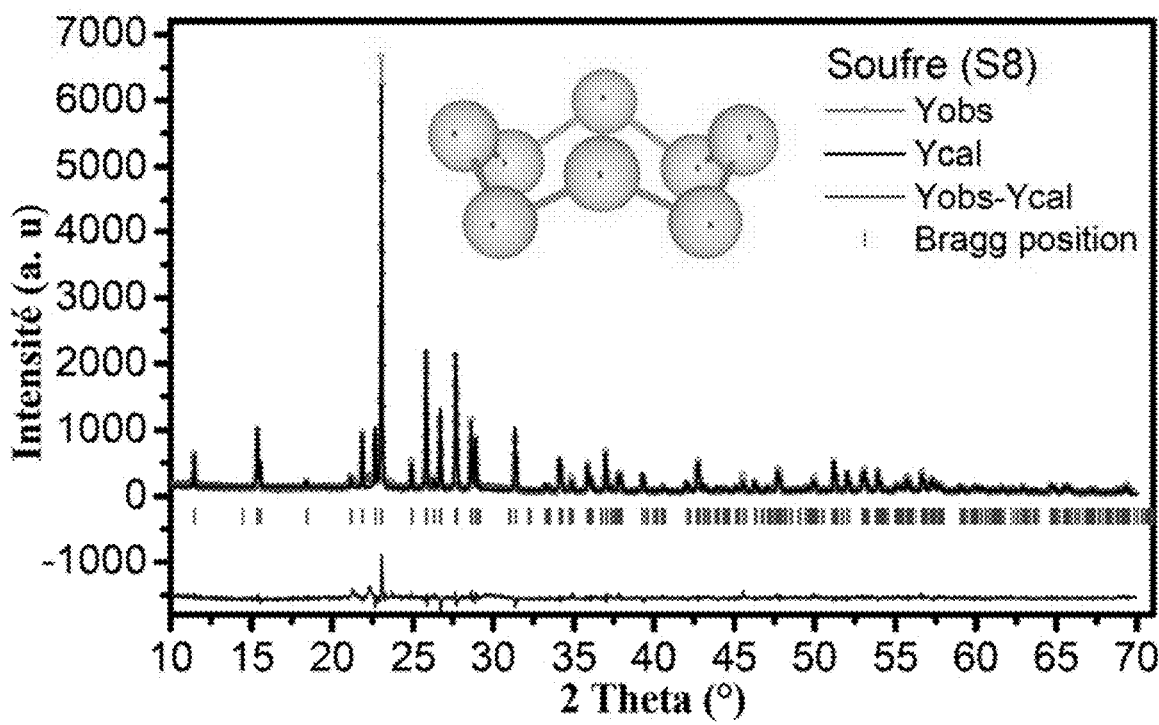
Figure 3: X-ray diffraction diffractogram of sulfur
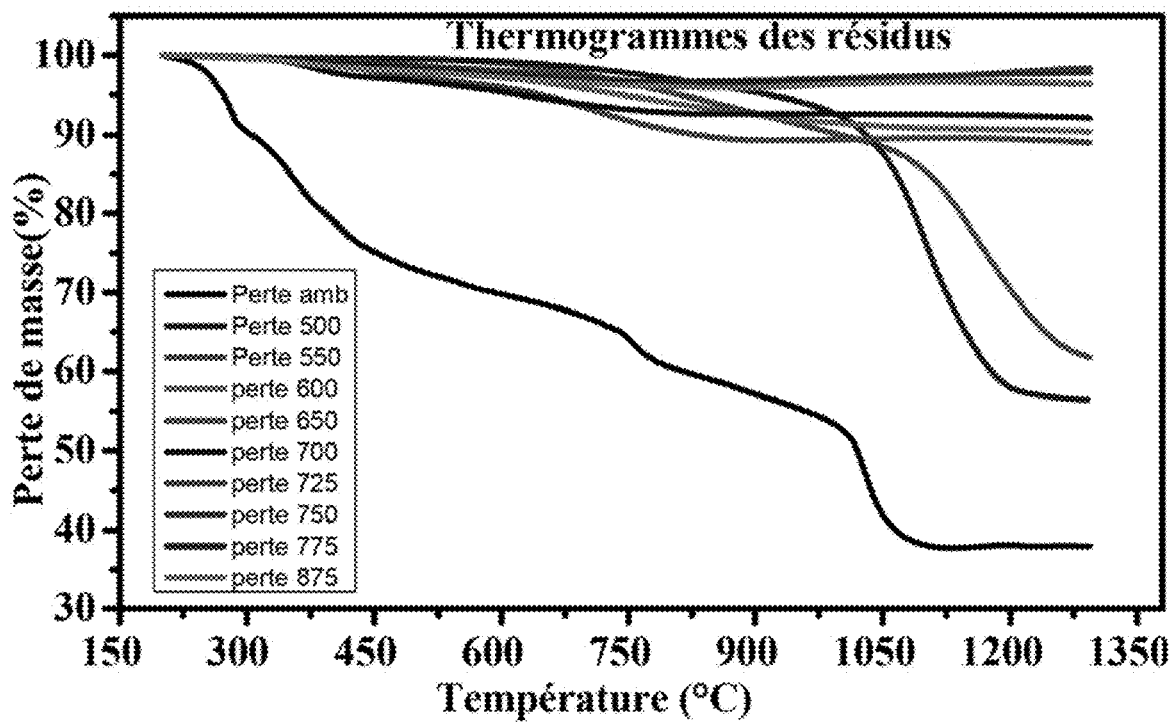
Figure 4: Thermogravimetric analysis of the various pyrolysis residues

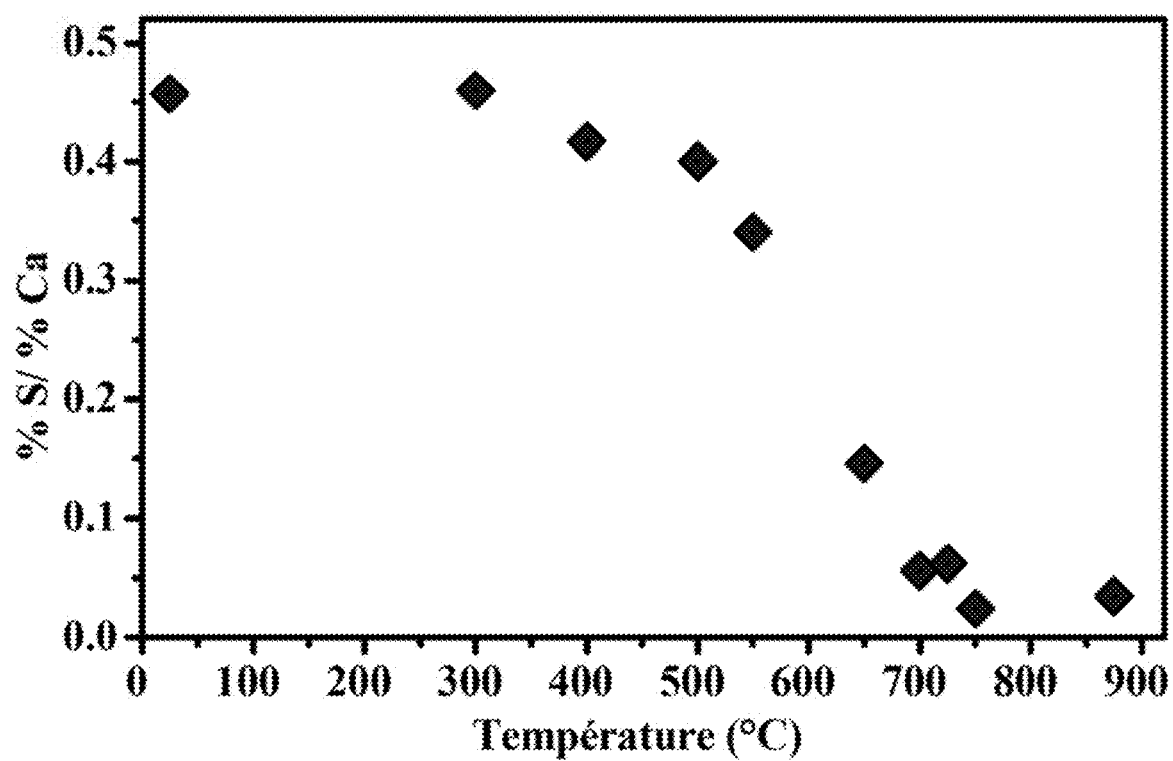
Figure 5: Evolution of the sulfur percentage / Calcium percentage ratio as a function of the pyrolysis temperature

METHOD FOR PRODUCING SULFUR FROM PHOSPHOGYPSUM

FIELD OF THE INVENTION

The present invention relates to a new process for transforming phosphogypsum, a by-product of the manufacture of phosphoric acid, into products with high added value. It consists of reducing the sulfate ion thermally and obtaining elemental sulfur accompanied by organo-sulphur molecules and hydrogen sulfide. This process has the advantage of being low in energy (550 to 900° C.) and requires reagents of low economic value which are themselves only by-products.

STATE OF THE PRIOR ART

Phosphogypsum (PG) is a by-product of the production of phosphoric acid from phosphate rock by the wet process. It is recovered directly from the phosphate attack reactor with sulfuric acid or as a phosphoric acid settling slurry (AP29 or AP54). The production of phosphogypsum amounts to 5 tons per ton of produced P2O5.

Several attempts to revalue phosphogypsum have been initiated in the chemical industry and in civil engineering, especially in backfill and construction materials (cement [1]), in the road industry, in agriculture [2], etc. However, phosphogypsum contains impurities that can cause other environmental problems such as pollution of groundwater or bodies of water [2].

In 1976, the Claus process was developed where H2S and SO2 reacted in the vapor phase to produce sulfur and water. The H2S is first separated from the host gas stream using amine extraction. Then it is sent to the Claus unit, where it is converted in two process steps (Chandler and Isbell, 1976 [3]). The first step is the thermal step where one third of H2S is oxidized, producing H2S and SO2 in a 2:1 ratio. This is done in a reaction oven at high temperatures (1000-1400° C.). A certain amount of sulfur is formed, but the remaining unreacted H2S goes to the next step which is the catalytic step. This process is very expensive.

Mbhele et al [4] have developed a process for recovering sulfur from gypsum as waste. They made a reduction of the gypsum to calcium sulphide; ginning the sulphide with CO2 and then producing sulfur. The gypsum is reduced to CaS with activated carbon in a tube furnace at 1100° C. The reaction of gaseous CO2 with the CaS sludge causes the vaporization of the sulphides to form H2S gas and the precipitation of CaCO3. The H2S generated was then reacted with SO2 in the PIPco processes to form elemental sulfur. Sulfur having a purity between 95% and 99% was recovered. The process remains long and energy intensive.

In recent work [5], researchers decomposed calcium sulfate into calcium oxide (CaO) and sulfur dioxide (SO2). The solid product, CaO, can be used in the production of cement and the gaseous product, SO2 can be used in the production of sulfuric acid. This process requires a significant initial investment and it still consumes energy since it is necessary to maintain the temperature of the reactor at 1100° C. In addition, the process uses carbon monoxide (which is very toxic) and for the production of 100 tons of SO2, 69 tons of CO2 invades the environment)

Despite this research and revaluation, to date, phosphogypsum does not find any interesting use and remains a troublesome by-product for the phosphate industry. In general, it is either discharged in the marine environment or stored in the open air.

The price of sulfur has increased by around 500% and continues to rise in recent years [6]. Phosphogypsum contains a significant amount of sulfur, which requires recycling to extract it.

For our part, our research has enabled us to develop a new process for transforming phosphogypsum into products with high added value. It consists of reducing the sulfate ion thermally and obtaining elemental sulfur accompanied by organo-sulphur molecules and hydrogen sulfide. This process has the advantage of being low in energy (550 to 900° C.) and requiring reagents of low economic value and which themselves are only by-products.

SUMMARY OF THE INVENTION

The objective of the invention is the development of a new process for the production of S8 sulfur from phosphogypsum, a by-product of the production of phosphoric acid. During this process, the phosphogypsum is mixed with a source of carbon and hydrogen forming a slip after mixing with water or an organic oil. This source of carbon and hydrogen is a natural or synthetic organic polymer. It can be mad of, for example, biomass, used tires or plastic, kerogen or tars can be used although this should not be restricted to the above wording. The slip is passed through an extruder to form granules in the form of a composite material (phosphogypsum—organic polymer). The granules undergo a heat treatment (100 to 150° C.) to ensure the evaporation of the mixing water. The product obtained is called the sulfur precursor (PS).

The PS undergoes a heat treatment (550 to 900° C.) in a neutral and/or partially oxidizing atmosphere (nitrogen—water vapor). The gases generated are bubbled through demineralized water, a sodium hypochlorite solution or a basic aqueous solution which allows the trapping, among other things, of organosulfur molecules and the precipitation of elemental sulfur S8. The gases not trapped by water are recovered to be fractionated and extract the volatile sulfur products. This process can be carried out at temperatures lower than those of conventional sulfur production. The sulfuric acid produced from S8 is pure.

DESCRIPTION OF THE DRAWINGS

FIG. 1: Diagram of the pyrolizer.
FIG. 2: X-ray diffraction diffractogram of the sulfur obtained
FIG. 3: Analysis by SEM-EDS.
FIG. 4: thermogravimetric analysis of the different residues for different pyrolysis temperatures.
FIG. 5: Evolution of the sulfur percentage/Calcium percentage ratio as a function of the pyrolysis temperature.

SUMMARY OF THE INVENTION

The object of the present invention is to implement a new process for producing sulfur from phosphogypsum. To do this, the invention aims to develop an efficient process for obtaining elemental sulfur S8 by reduction of the sulfate ion in the presence of a source of carbon and hydrogen (natural or synthetic organic polymer) at low temperatures from 550° C.

There are four stages in the production of S8 sulfur:
1. Preparation of the mixture: The phosphogypsum is mixed with a source of carbon and hydrogen (synthetic or natural organic polymers).

2. Treatment of the mixture: the mixture is treated, at a temperature ranging from 80 to 150° C., to form a sulfate-organic polymer composite.

3. Pyrolysis of the precursor: the precursor is heat treated, in a furnace with conventional fixed, rotary or fluidized bed heating, in a totally or partially inert medium at a temperature between 550 and 900° C.

4. Sulfur recovery: The gases produced are bubbled through an aqueous or organic solution (water, alcohol, sodium hypochlorite, alkaline hydroxide).

EXAMPLE

The following example is provided to describe the manufacturing process for S8 sulfur. However, the example should not be interpreted as limiting the manufacturing process which has been developed within the frame of the invention.

Preparation of the precursor: Different sources of carbon, synthetic or natural organic polymers, were tested for different mass ratios of the phosphogypsum mixture/source of carbon and hydrogen. The mixture was heat treated to form a sulfate-organic polymer composite. In fact, under the effect of temperature, water evaporates and thus allows the formation of organic polymer/phosphogypsum composites.

Pyrolysis of the precursor: This step consists of a heat treatment of the precursor in a tubular pyrolizer (FIG. 1).

The gaseous sulfur products formed are bubbled through an aqueous or organic solution (water, alcohol, sodium hypochlorite, alkaline hydroxide).

At the end of the reaction, the sulfur produced in the form of a solid precipitate can be recovered after filtration or decantation.

Organic solutions containing sulfur can be used as a raw material for the synthesis of sulfur compounds. Sulfur S8 has various applications in the synthesis of sulfur-based materials. Another application is in the production of high purity sulfuric acid.

Analysis by scanning electron microscope (FIG. 2) clearly showed that the material contains more than 99% sulfur, this result was confirmed by X-ray fluorescence. To determine the nature of the sulfur obtained, a study by diffraction of the X-rays.

Analysis of the X-ray diffraction diffractogram (FIG. 3) clearly showed the presence of a single phase which is none other than sulfur S8.

The thermogravimetric analysis of the various pyrolysis residues (FIG. 4) clearly shows that from 550° C., the loss of mass relating to the decomposition of calcium sulphate (from 990 to about 1150° C.) decreases depending on of the pyrolysis temperature and practically disappears for the treated residues from 650° C.

FIG. 5 illustrates the sulfur/calcium ratio of the residues as a function of the temperature of the pyrolysis, it is clearly seen that this ratio decreases as a function of the temperature. Above 650° C., this ratio is almost zero, thus showing that the majority of the sulfur contained in the gypsum is transformed into elemental or combined sulfur.

INDUSTRIAL APPLICATION

The reaction can be carried out at a much lower temperature than that by the conventional method, thus producing a great saving of energy. As application we can consider the production of pure sulfuric acid for different industrial uses.

BIBLIOGRAPHICAL REFERENCES

[1] L. Yang et al., "Utilization of phosphogypsum for the preparation of non-autoclaved aerated concrete," vol. 44, p. 600-606, 2013.

[2] M. Zairi and M. Rouis, "Environmental impacts of the storage of phosphogypsum in Sfax (Tunisia)." flight. 219, p. pp 29-40, 1999.

[3] Chandler, R. H. and Isbell, R.A.C. 1976. The Claus Process. R. H. Chandler Ltd., Braintree, USA.

[4] N. R. Mbhele, W. Van der Merwe, J P Maree and D. Theron, recovery of sulfur from waste gypsum, Abstracts of the International Mine Water Conference, Proceedings ISBN: number 978-0-9802623-5-3, 19-23 Oct. 2009, Pretoria, South Africa

[5] Sandrine Marty, production of calcium oxide and sulfur dioxide from the decomposition of phosphogypsum, Master of Applied Science, Department of Chemical Engineering, École Polytechnique de Montréal.

[6] G. d. Canada. (2013, February 2014). Natural Resources Canada. Archived—Sulfur, http://www.nr-can.gc.ca/mines-materiaux/marches/annuaire-mineraux-canada/2009/8471.

The invention claimed is:

1. A process for preparing elemental sulfur from phosphogypsum, wherein the process is carried out in four steps described below:
   Step 1: making a mixture of phosphogypsum and a source of carbon and hydrogen;
   Step 2: treating the mixture obtained in Step 1 at a temperature ranging from 80° C. to 150° C. to form an organic sulfate polymer composite;
   Step 3: treating the organic sulfate polymer composite of Step 2 in an inert or partially inert atmosphere at a temperature ranging from 550° C. to 900° C. whereby organo-sulphur compounds, sulfur and gaseous hydrogen sulphide are produced accompanied by water vapor and carbon dioxide;
   Step 4: recovering said elemental sulfur or said organo-sulfur compounds characterized in that the gas formed is bubbled through an aqueous solution or a solution of sodium hypochlorite, alkali hydroxide, alcohol or H2O2.

2. The process according to claim 1, wherein the carbon source is selected from the group consisting of synthetic or natural organic polymers, plant biomass, fossil resources and any residual organic matter.

3. The process of claim 2, wherein said fossil resources are selected from the group consisting of heavy hydrocarbons, oil shales, and any residual organic matter.

4. The process according to claim 1, wherein said Step 3 is carried out at a temperature below 750° C.

5. The process according to claim 1, wherein the gas formed is condensed in solid form, by precipitation, in the form of said elemental sulfur or said organo-sulfur compounds.

* * * * *